United States Patent
Lo et al.

(10) Patent No.: US 11,074,821 B2
(45) Date of Patent: Jul. 27, 2021

(54) ROUTE PLANNING METHODS AND APPARATUSES FOR UNMANNED AERIAL VEHICLES

(71) Applicant: GEOSAT Aerospace & Technology, Tainan (TW)

(72) Inventors: Cheng-Fang Lo, Tainan (TW); Cheng-De Huang, Tainan (TW)

(73) Assignee: GEOSAT AEROSPACE & TECHNOLOGY, Tainan (TW)

( * ) Notice: Subject to any disclaimer, the term of this patent is extended or adjusted under 35 U.S.C. 154(b) by 500 days.

(21) Appl. No.: 15/727,526

(22) Filed: Oct. 6, 2017

(65) Prior Publication Data

US 2018/0102057 A1 Apr. 12, 2018

(30) Foreign Application Priority Data

Oct. 6, 2016 (TW) .................. 105132453

(51) Int. Cl.
*G08G 5/00* (2006.01)
*B64C 39/02* (2006.01)
*G05D 1/10* (2006.01)

(52) U.S. Cl.
CPC ......... *G08G 5/0069* (2013.01); *B64C 39/024* (2013.01); *G05D 1/101* (2013.01);
(Continued)

(58) Field of Classification Search
CPC combination set(s) only.
See application file for complete search history.

(56) References Cited

U.S. PATENT DOCUMENTS 5,867,804 A    2/1999   Pilley et al.
6,401,038 B2   6/2002   Gia
                        (Continued)

FOREIGN PATENT DOCUMENTS

CN    103017753 B    7/2015
TW    104132826      10/2015

OTHER PUBLICATIONS

Santamaria, E.; Segor, F.; Tchouchenkov, I. Rapid Aerial Mapping with Multiple Heterogeneous Unmanned Vehicles. In Proceedings of the 10th International Conference on Information Systems for Crisis Response and Management (ISCRAM), Baden-Baden, Germany, May 12-15, 2013. (Year: 2013).*

(Continued)

*Primary Examiner* — Christian Chace
*Assistant Examiner* — Amelia Vorce
(74) *Attorney, Agent, or Firm* — Finnegan, Henderson, Farabow, Garrett & Dunner LLP

(57) ABSTRACT

The present application provides route planning methods and apparatuses for an unmanned aerial vehicle. An exemplary route planning method may include determining a quadrant angle in accordance with a starting point and an ending point. The route planning method may also include determining a flight shifting distance in accordance with the quadrant angle, a first interval between waypoints, and a second interval between routes. The route planning method may further include generating a plurality of waypoints and a plurality of routes in accordance with the quadrant angle, the flight shifting distance, the first interval between waypoints, and the second interval between routes. In addition, the route planning method include planning a flight path in accordance with the plurality of waypoints and the plurality of routes.

18 Claims, 17 Drawing Sheets

(52) U.S. Cl.
CPC ......... *G08G 5/0013* (2013.01); *G08G 5/0026* (2013.01); *G08G 5/0034* (2013.01); *B64C 2201/14* (2013.01); *B64C 2201/141* (2013.01)

(56) References Cited

U.S. PATENT DOCUMENTS

| | | | |
|---|---|---|---|
| 7,483,790 | B2 | 1/2009 | Brent et al. |
| 7,558,654 | B2 | 7/2009 | Chatfield et al. |
| 7,925,393 | B2 | 4/2011 | Bolt, Jr. et al. |
| 7,979,199 | B2 | 7/2011 | Judd et al. |
| 8,065,043 | B2 | 11/2011 | Gremmert |
| 8,135,566 | B2 | 3/2012 | Marshall et al. |
| 8,229,659 | B2 | 7/2012 | Judd et al. |
| 8,718,838 | B2 | 5/2014 | Kokkeby et al. |
| 8,798,812 | B2 | 8/2014 | Ryu et al. |
| 8,818,712 | B2 | 8/2014 | Sandoval et al. |
| 8,890,951 | B2 | 11/2014 | Zhang et al. |
| 9,127,948 | B2 | 9/2015 | Sandoval et al. |
| 2008/0183343 | A1 | 7/2008 | Brent et al. |
| 2012/0143505 | A1 | 6/2012 | Giovannini et al. |
| 2012/0253664 | A1 | 10/2012 | Sandoval et al. |
| 2012/0277986 | A1 | 11/2012 | Judd et al. |
| 2014/0018979 | A1 | 1/2014 | Goossen et al. |
| 2015/0066248 | A1* | 3/2015 | Arbeit ................. G01C 21/20 701/2 |
| 2015/0226575 | A1* | 8/2015 | Rambo ................. B64C 39/024 701/523 |
| 2016/0327959 | A1* | 11/2016 | Brown ................. G08G 5/0069 |
| 2017/0334559 | A1* | 11/2017 | Bouffard ............... B64C 39/024 |
| 2017/0337824 | A1* | 11/2017 | Chen .................... G08G 5/0086 |
| 2018/0350054 | A1* | 12/2018 | Fox ..................... G06K 9/00657 |

OTHER PUBLICATIONS

Jiao, Y.S.; Wang, X.M.; Chen, H.; Li, Y. Research on the Coverage Path Planning of UAVs for Polygon Areas. In Proceedings of the 2010 5th IEEE Conference on Industrial Electronics and Applications, Taichung, Taiwan, Jun. 15-17, 2010; pp. 1467-1472. (Year: 2010).*

Kagabo, Wilson, "Optimal trajectory planning for a UAV glider using atmospheric thermals", Aug. 1, 202010, Rochester Institute of Technology, Thesis (Year: 2010).*

Shkel, Andrei M. and Lumelsky, Vladimir, "Classification of the Dubins set", Aug. 14, 1998, Department of Mechanical and Aerospace Engineering, University of Calilfornia (Irvine), and Department of Mechanical Engineering, University of Wisconsin-Madison (Year: 1998).*

Spry, Stephen C. et al., "Convoy Protection using Multiple Unmanned Aerial Vehicles: Organizing and Coordination", Jun. 8, 2005, 2005 American Control Conference (Year: 2005).*

AOPA, "Safety Advisor Collision Avoidance" webpage, Jul. 27, 2016, retrieved from: https://www.aopa.org/training-and-safety/online-learning/safety-advisors-and-safety-briefs/collision-avoidance on Feb. 27, 2020 (Year: 2016).*

IPad Pilot News, "Understanding latitude and longitude in aviation apps", Aug. 24, 2016, retrieved from: /https://ipadpilotnews.com/2016/08/understanding-latitude-longitude-aviation-apps-2/ on Feb. 27, 2020 (Year: 2016).*

* cited by examiner

ROUTE PLANNING METHODS AND APPARATUSES FOR UNMANNED AERIAL VEHICLES

CROSS REFERENCE TO RELATED APPLICATION

The present application claims the benefit of priority to Taiwanese Application No. 105132453, filed Oct. 6, 2016, the entire contents of which are incorporated herein by reference.

BACKGROUND

An unmanned aerial vehicle (UAVs) is an aircraft without a human pilot aboard. UAVs are able to endure flight conditions that would be unbearable by humans. Moreover, with UAVs, there are no human casualties in any accidents. This makes UAVs attractive to be used in many applications. At present, UAVs are used extensively in applications such as the photography of terrain and landforms, weather and disaster monitoring, patrolling of the coastline, traffic monitoring and control, and monitoring of nuclear, biological and chemical contamination of the environment.

Conventional unmanned aerial vehicles, however, require manual and remote control. Many aspects of controlling UAVs still need to be improved for practical applications. Therefore, one of important issues for the UAV sector is to enhance the UAV control, thereby enabling UAVs to fly according to a planned route without or with only minimal manual control.

SUMMARY

Embodiments of the present disclosure provide route planning methods and apparatuses for an unmanned aerial vehicle to fly according to a planned route without manual control.

These embodiments include a route planning method for an unmanned aerial vehicle. The route planning method may include determining a quadrant angle in accordance with a starting point and an ending point. The route planning method may also include determining a flight shifting distance in accordance with the quadrant angle, a first interval between waypoints, and a second interval between routes. The route planning method may further include generating a plurality of waypoints and a plurality of routes in accordance with the quadrant angle, the flight shifting distance, the first interval between waypoints, and the second interval between routes. In addition, the route planning method may include planning a flight path in accordance with the plurality of waypoints and the plurality of routes.

These embodiments also include a route planning apparatus for an unmanned aerial vehicle. The route planning apparatus may include memory storing instructions. The route planning apparatus may also include one or more processors configured to execute the instructions to determine a quadrant angle in accordance with a starting point and an ending point. The one or more processors of the route planning apparatus may also be configured to determine a flight shifting distance in accordance with the quadrant angle, a first interval between waypoints, and a second interval between routes. The one or more processors of the route planning apparatus may further be configured to generate a plurality of waypoints and a plurality of routes in accordance with the quadrant angle, the flight shifting distance, the first interval between waypoints, and the second interval between routes. In addition, the one or more processors of the route planning apparatus may also be configured to plan a flight path in accordance with the plurality of waypoints and the plurality of routes.

Moreover, these embodiments include a non-transitory computer-readable medium storing instructions which, when executed, cause one or more processors to perform operations for route planning for an unmanned aerial vehicle. The operations may include determining a quadrant angle in accordance with a starting point and an ending point. The operations may also include determining a flight shifting distance in accordance with the quadrant angle, a first interval between waypoints, and a second interval between routes. The operations may further include generating a plurality of waypoints and a plurality of routes in accordance with the quadrant angle, the flight shifting distance, the first interval between waypoints, and the second interval between routes. In addition, the operations include planning a flight path in accordance with the plurality of waypoints and the plurality of routes.

The route planning methods and apparatuses for unmanned aerial vehicles in the present disclosure can carry out calculations using a starting point and an ending point to obtain waypoints and routes, and plan a flight path based on the waypoints and routes.

DETAILED DESCRIPTION

Many details are illustrated in the following descriptions to facilitate a comprehensive understanding of the present disclosure. Methods and apparatuses in the present disclosure may be implemented in many other ways different from these described herein. Those skilled in the art may make similar extensions without departing from the connotation of the present disclosure. Therefore, the present disclosure is not limited to specific implementations disclosed in the following.

The technical solutions of the present disclosure will be described in detail with reference to accompanying drawings and embodiments. It should be noted that, if not conflicting, the embodiments of this application and various features in the embodiments may be combined with each other, which are all within the protection scope of this application. In addition, although a logical order is shown in the flow charts, in some cases, the steps shown or described may be executed in an order different from that herein.

The embodiments of the present application relate to route planning methods and apparatuses for unmanned aerial vehicles, and more particularly, to route planning methods and apparatuses for determining a plurality of waypoints to generate a flight path covering a planned area for unmanned aerial vehicles. UAVs may fly, without manual control, over the planned area to accomplish missions, such as photography shooting, weather or disaster monitoring, patrolling of the coastline, traffic monitoring and control, monitoring of nuclear, and biological and chemical contamination of the environment.

Figure 1:
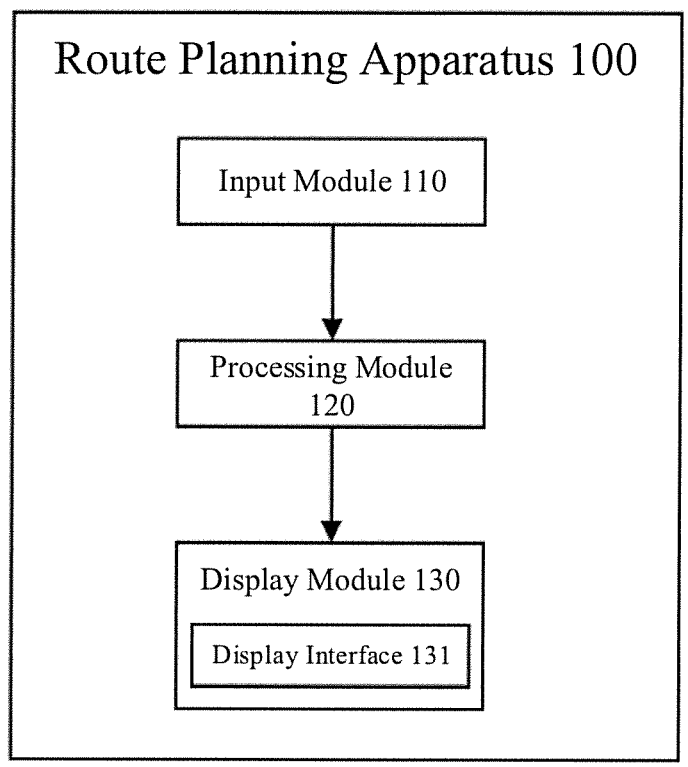
FIG. 1 is a block diagram of an exemplary route planning apparatus for an unmanned aerial vehicle, according to some embodiments of the present disclosure.

FIG. 1 is a block diagram of a route planning apparatus for an unmanned aerial vehicle, according to some embodiments of the present disclosure. The route planning apparatus 100 for an unmanned aerial vehicle includes an input module 110, a processing module 120, and a display module 130.

In the route planning apparatus 100, input module 110 may be configured to obtain a starting point and an ending point. For example, a user may set a starting point and an ending point through input module 110. Input module 110 may be configured to receive the input starting point and the ending point. As another example, input module 110 may be configured to obtain a starting point and an ending point for route planning from a memory or a storage.

Processing module 120 is coupled to input module 110. Processing module 120 may be configured to obtain the starting point and the ending point from input module 110. Processing module 120 may also be configured to determine a quadrant angle in accordance with the starting point and the ending point. Processing module 120 may further be configured to determine a flight shifting distance in accordance with the quadrant angle, a first interval between waypoints, and a second interval between routes. In addition, processing module 120 may be configured to generate a plurality of waypoints and a plurality of routes in accordance with the quadrant angle, the flight shifting distance, the first interval between waypoints, and the second interval between routes. Moreover, processing module 120 may be configured to plan a flight path in accordance with coordinates of the plurality of waypoints and the plurality of routes.

Display module 130 is coupled to processing module 120 and further includes a display interface 131. Display module 130 may be configured to receive the planned flight path by processing module 120, and display the flight path on display interface 131. Display interface 131 may be configured to display the planned flight path.

In general, the modules (and any sub-modules) described herein can be a packaged functional hardware unit designed for use with other components (e.g., portions of an integrated circuit) and/or a part of a program (stored on a computer readable medium) that performs a particular function of related functions. The module/unit can have entry and exit points and can be written in a programming language, such as, for example, Java, Lua, C, or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other non-transitory medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors.

Route planning apparatus 100 may be configured to display the planned flight path on the apparatus itself, or to output the planned flight path to a target visual airspace environment and display a diagram of the planned flight path, waypoints, and/or routes on display interface 131 of display module 130. Display interface 131 can be a map interface. In addition, the planned flight path can also be displayed on any other map platforms, such as Google Earth.

The planned flight paths may be processed together with terrain data for comparison, analysis, or identification of relevant terrain data.

Route planning apparatus 100 may include memory (not shown) and one or more processors to implement input module 110, processing module 120, and/or display module 130. The memory may be configured to store instructions and relevant data for route planning. The one or more processors may be configured to execute the instructions to implement the above described functions of input module 110, processing module 120, and/or display module 130 for route planning. The one or more processors may also be configured to execute the instructions to implement the following route planning methods for an unmanned aerial vehicle.

The memory may include a non-permanent memory, a random access memory (RAM), and/or a nonvolatile memory, such as a read-only memory (ROM) or a flash memory (flash RAM), in computer-readable media. The memory is an example of computer-readable media. The memory may include module 1, module 2, ..., module N, where N is an integer greater than 2.

The computer-readable media includes permanent and non-permanent, removable and non-removable storage media. The storage media may realize information storage with any method or technology. The information may be a computer-readable instruction, data structure, program module or other data. Examples of non-transitory computer readable media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disk read-only memory (CD-ROM), digital versatile disc (DVD) or other optical storage, magnetic cassette tape, magnetic disk storage or other magnetic storage devices, cache, register, or any other non-transmission media that can be used to store information that can be accessed by computing devices. As defined herein, the computer-readable media do not include transitory media, such as modulated data signals and carriers.

Figure 2:
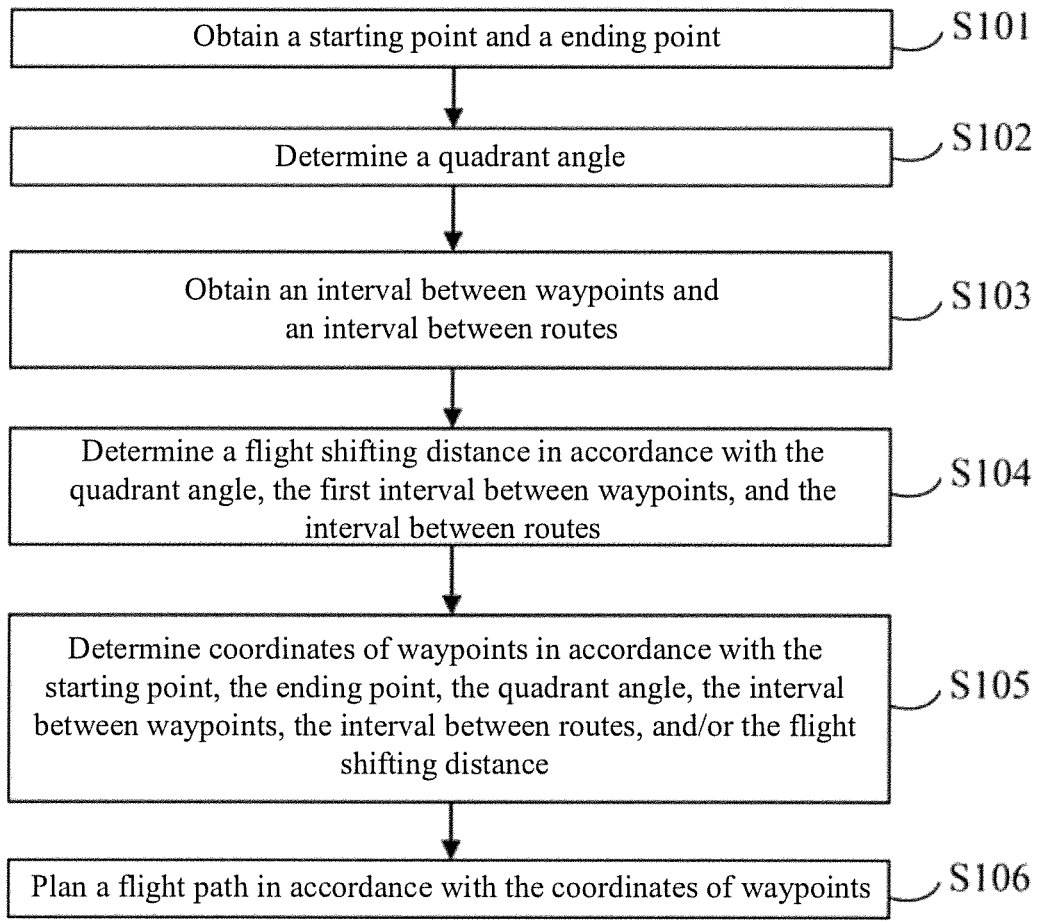
FIG. 2 is a flow chart of an exemplary route planning method for an unmanned aerial vehicle, according to some embodiments of the present disclosure.

FIG. 2 is a flow chart of a route planning method for an unmanned aerial vehicle, according to some embodiments of the present disclosure. The route planning method can be used in an above route planning apparatus (e.g., route planning apparatus 100 of FIG. 1) or a route planning system for an unmanned aerial vehicle. The route planning method can include the following steps:

Step S101: Obtain a starting point and/or an ending point.

Step S102: Determine a quadrant angle in accordance with the starting point and the ending point.

Step S103: Obtain an interval between waypoints and an interval between routes in accordance with the starting point and the ending point.

Step S104: Determine a flight shifting distance in accordance with the quadrant angle, the first interval between waypoints, and the interval between routes.

Step S105: Determine coordinates of waypoints for photography shooting in accordance with the starting point, the ending point, the quadrant angle, the interval between waypoints, the interval between routes, and/or the flight shifting distance.

Step S106: Plan a flight path in accordance with the coordinates of waypoints.

Figure 3:
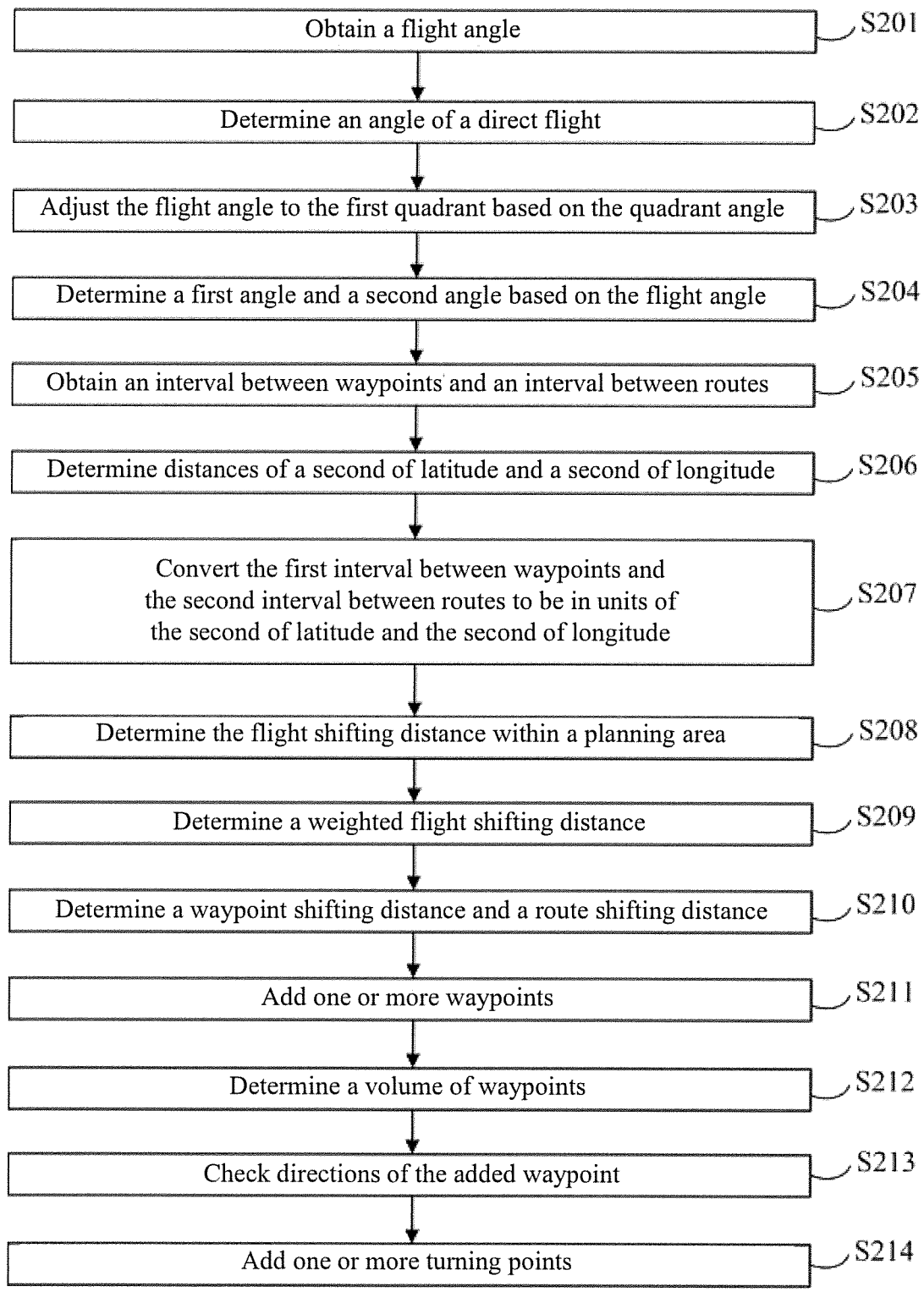
FIG. 3 is a flow chart of an exemplary route planning method for an unmanned aerial vehicle, according to some embodiments of the present disclosure.

FIG. 3 is a flow chart of a route planning method for an unmanned aerial vehicle, according to some embodiments of the present disclosure. Determining the quadrant angle of step S102 in FIG. 2 may also include the following steps:

Step S201: Obtain a flight angle.

Step S202: Determine an angle of a direct flight in accordance with coordinates of the starting point and the ending point.

Step S203: Adjust the flight angle to the first quadrant based on the quadrant angle.

S204: Determine a first angle and a second angle based on the flight angle.

Determining the quadrant angle between a starting point A and an ending point B may include determining the quadrant angle as:

The first quadrant when:
  a longitude of the starting point A is less than a longitude of the ending point B, and
  a latitude of the starting point A is less than a latitude of the ending point B.
The second quadrant when:
  the longitude of the starting point A is greater than the longitude of the ending point B, and
  the latitude of the starting point A is less than the latitude of the ending point B.
The third quadrant when:
  the longitude of the starting point A is greater than the longitude of the ending point B, and
  the latitude of the starting point A is greater than the latitude of the ending point B.
The fourth quadrant when:
  the longitude of the starting point A is less than the longitude of the ending point B, and
  the latitude of the starting point A is greater than the latitude of the ending point B.
The X-axis when:
  the latitude of the starting point A is equal to the latitude of the ending point B.
The Y-axis when:
  the longitude of the starting point A is equal to the longitude of the ending point B.

Figure 4:
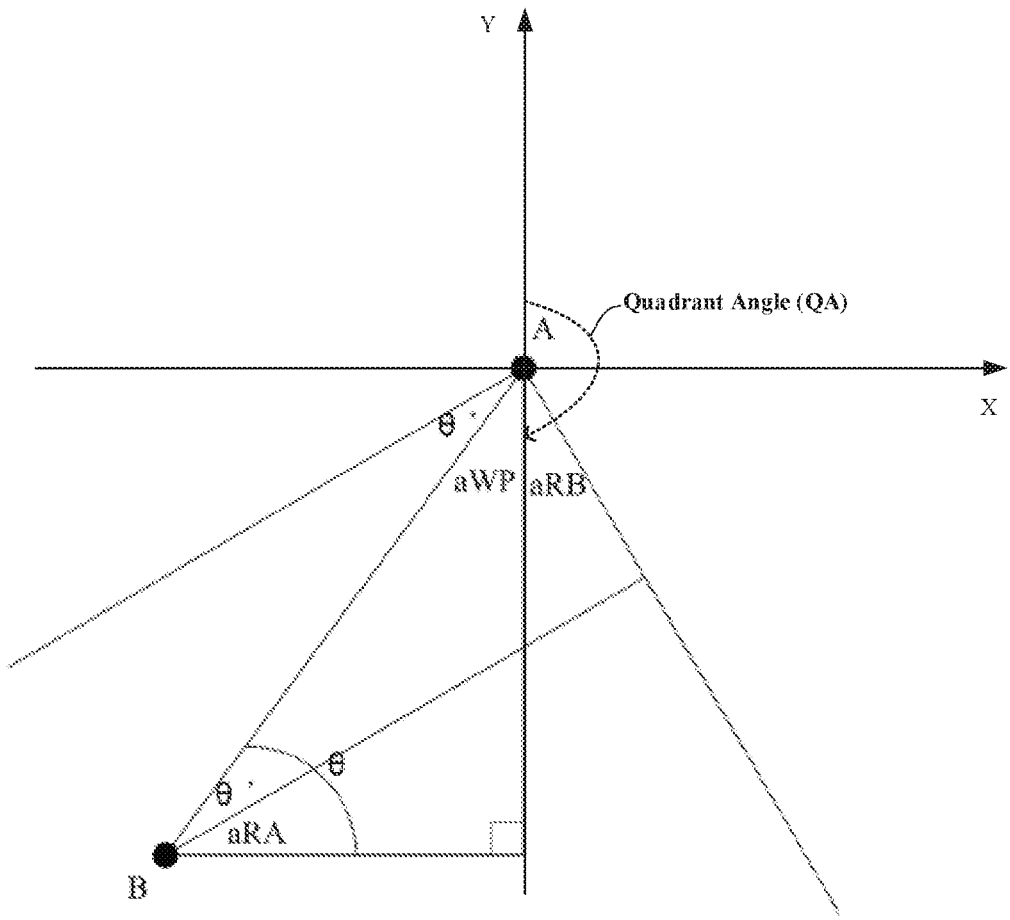
FIG. 4 is an exemplary schematic diagram of angle determination in an exemplary route planning method for an unmanned aerial vehicle, according to some embodiments of the present disclosure.
Figure 5:
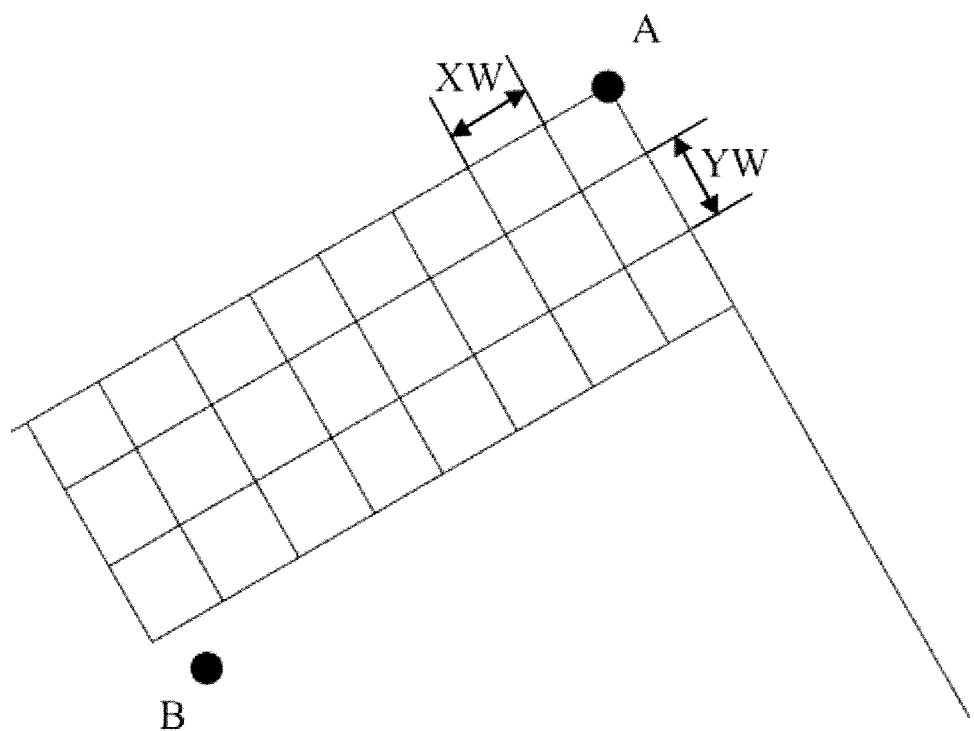
FIG. 5 is an exemplary schematic diagram of a planning area in an exemplary route planning method for an unmanned aerial vehicle, according to some embodiments of the present disclosure.

After determining the quadrant angle, as shown in FIG. 4, the method may include determining a flight angle in accordance with the starting point A and the ending point B, and checking whether the angle between the two is approximate to an X-axis, a latitude being parallel with the equator. The method may further include adjusting the flight angle to the first quadrant. Accordingly, as shown in FIG. 4, the angle aWP between the starting point A and the ending point B and the flight angle (shown below) are in the same quadrant. The method may further include determining two angles aRA and aRB in a planning area, as shown in FIG. 4. The planning area is a rectangular area formed in accordance with the flight angle, as shown in FIG. 5.

Adjusting the flight angle to the first quadrant may include the following steps.

The flight angle=θ'+aWP.
If the flight angle is 90° or 270°, θ=90°.
If the flight angle is less than 90°, θ remains unchanged.
If the flight angle is greater than 90°, θ is adjusted to the first quadrant by θ mod 90°.

Obtaining an interval between waypoints and an interval between routes in accordance with the starting point and the ending point in Step 103 may include the following steps, as shown in FIG. 3:

Step S205: Obtain an interval between waypoints and an interval between routes.

Step S206: Determine distances of a second of latitude and a second of longitude in accordance with the starting point and the ending point.

S207: Convert the first interval between waypoints and the second interval between routes to be in units of the second of latitude and the second of longitude.

The method may include obtaining the interval between waypoints and the interval between routes before route planning. For example, the method may include obtaining the interval between waypoints and the interval between routes from input module 110 shown in FIG. 1. A user may input the interval between waypoints and the interval between routes. As another example, the method may include obtaining the interval between waypoints and the interval between routes from a set of route planning data stored in memory. The interval between waypoints and the interval between routes may range, for example, between 10 cm to 1 km. The flight angle may range between 0° and 360°.

Since the earth is not an exact sphere or an exact ellipsoid, the distances of per second of a longitude and of per second of a latitude are different locations may be different from each other. Thus, the method may include determining distances for a second of latitude and a second of longitude at locations of interest. The method may include determining based on the following steps:

$$\text{Latitude Length}=m1+(m2*\cos(2\varphi))+(m3*\cos(4\varphi))+(m4*\cos(6\varphi)),$$

where m1=111132.92, m2=−559.82, m3=1.175, and m4=−0.0023 (these values are constants for latitude calculation).

$$\text{Longitude Length}=(n1*\cos \varphi)+(n2*\cos(3\varphi))+(n3*\cos(5\varphi)),$$

where n1=111412.84, n2=−93.5, and n3=0.118 (these values are constants for longitude calculation).

Determining the flight shifting distance in accordance with the quadrant angle, the interval between waypoints, and the second interval between routes in step S104 may include the following steps, as shown in FIG. 3:

Step S208: Determine the flight shifting distance within a planning area. The planning area is obtained in accordance with the flight angle.

Step S209: Determine a weighted flight shifting distance in accordance with the flight shifting distance and the flight angle.

Step S210: Determine a waypoint shifting distance between two waypoints on a route, and a route shifting distance between two of the plurality of routes.

FIG. 5 is an exemplary schematic diagram of a planning area in a route planning method for an unmanned aerial vehicle, according to some embodiments of the present disclosure. The method may include determining a planning area in accordance with the distances of the interval between waypoints and the interval between routes. In some embodiments, these distances can be represented in units of the second of latitude and the second of longitude, as illustrated above. The method may include determining the planning area in accordance with trigonometry, the law of sine, and those distances and angles determined above.

After determining the planning area, the method may include determining a planning route and coordinates of waypoints and routes of the planned route in accordance with a weight, XW, for the interval between waypoints and a weight, YW, for the interval between routes. These waypoints may form a waypoint planning matrix on the planning area, as shown in FIG. 5. Determining shifting distance of the method may include determining based on the weights from the flight angle. For example, the weight, XW, for the interval between waypoints and the weight, YW, for the interval between routes may be obtained as follows:

$$XW=((90°-\theta')/90°)*\text{longitude length}+(\theta'/90°)*\text{latitude length}.$$

$$YW=(\theta'/90°)*\text{longitude length}+((90°-\theta')/90°)*\text{latitude length}.$$

Determining coordinates of waypoints for photography shooting in accordance with the starting point, the ending point, the quadrant angle, the interval between waypoints, the interval between routes, and/or the flight shifting distance in step S105 may further include one or more of the following steps, as shown in FIG. 3:

Step S211: Add one or more waypoints in accordance with a type of the quadrant angle.

Step S212: Determine a volume of waypoints on the planned flight path.

Step S213: Check directions of the added waypoint.

Step S214: Add one or more turning points.

Figure 6:
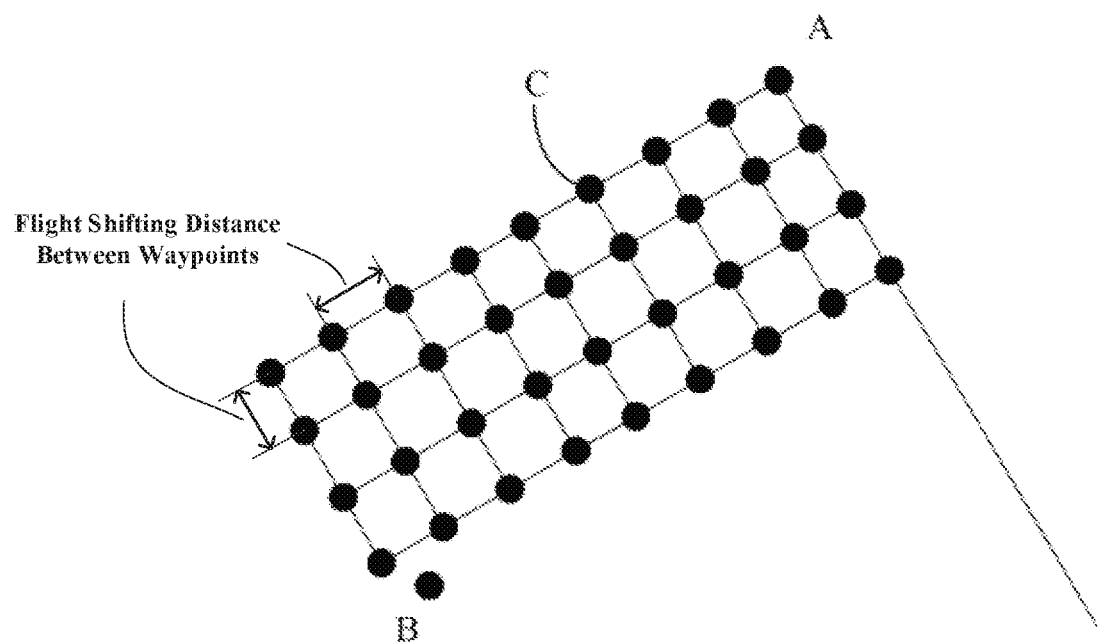
FIG. 6 is an exemplary schematic diagram of waypoints in an exemplary route planning method for an unmanned aerial vehicle, according to some embodiments of the present disclosure.

FIG. 6 is an exemplary schematic diagram of waypoints in a route planning method for an unmanned aerial vehicle, according to some embodiments of the present disclosure. In the above calculations, the adjustment to the first quadrant may need to be re-adjusted back to original directions or angles. As shown in FIG. 6, when adding a waypoint C, the method may include re-adjusting relevant parameters in accordance with the type of the quadrant angle. Re-adjusting relevant parameters of the method may include: (1) switching the increasing or decreasing of the quadrant angle that is determined in accordance with coordinates of the starting point and the ending point; (2) if the flight angle is greater than the angle between the direct flight direction, from the starting point to the ending point, and the latitude, switching the increasing or decreasing of shifting distances; and (3) if the flight angle is greater than the angle between the direct flight direction, from the starting point to the ending point, and the latitude, switching the weight XW for the interval between waypoints and the weight YW for the interval between routes.

When adding the waypoint C, the method may include checking the direction of the route that the waypoint C is going to be added on. For example, the method may include considering an odd number of the route as a reverse direction while considering the UAV flies in outgoing and returning trips.

Figure 7:
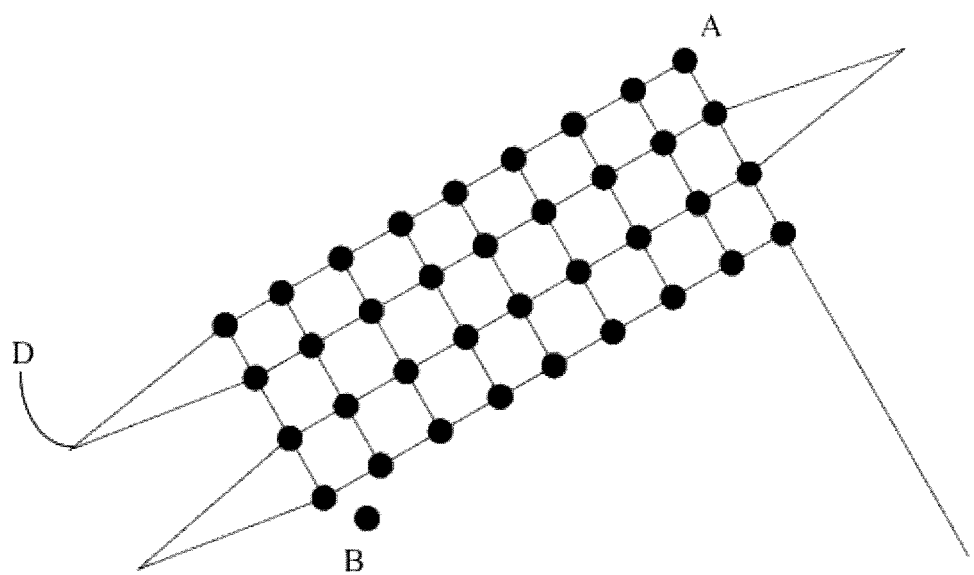
FIG. 7 is a schematic diagram of exemplary turning points in an exemplary route planning method for an unmanned aerial vehicle, according to some embodiments of the present disclosure.

FIG. 7 is an exemplary schematic diagram of turning points in a route planning method for an unmanned aerial vehicle, according to some embodiments of the present disclosure. As shown in FIG. 7, the method may further include adding one or more turning points. For example, the method can include adding a turning point D at a distance to avoid potential errors that may be caused when the UAV turns around to the next route for photography shooting. The turning point D can smooth the flight path and allow the UAV to be on a right direction in the beginning of the next route.

In the present disclosure, these route planning methods and apparatuses for an unmanned aerial vehicles can plan a suitable and smooth flight path in accordance with the starting point, the ending point, a plurality of waypoints, a plurality of routes, and one or more turning points.

Figure 8:
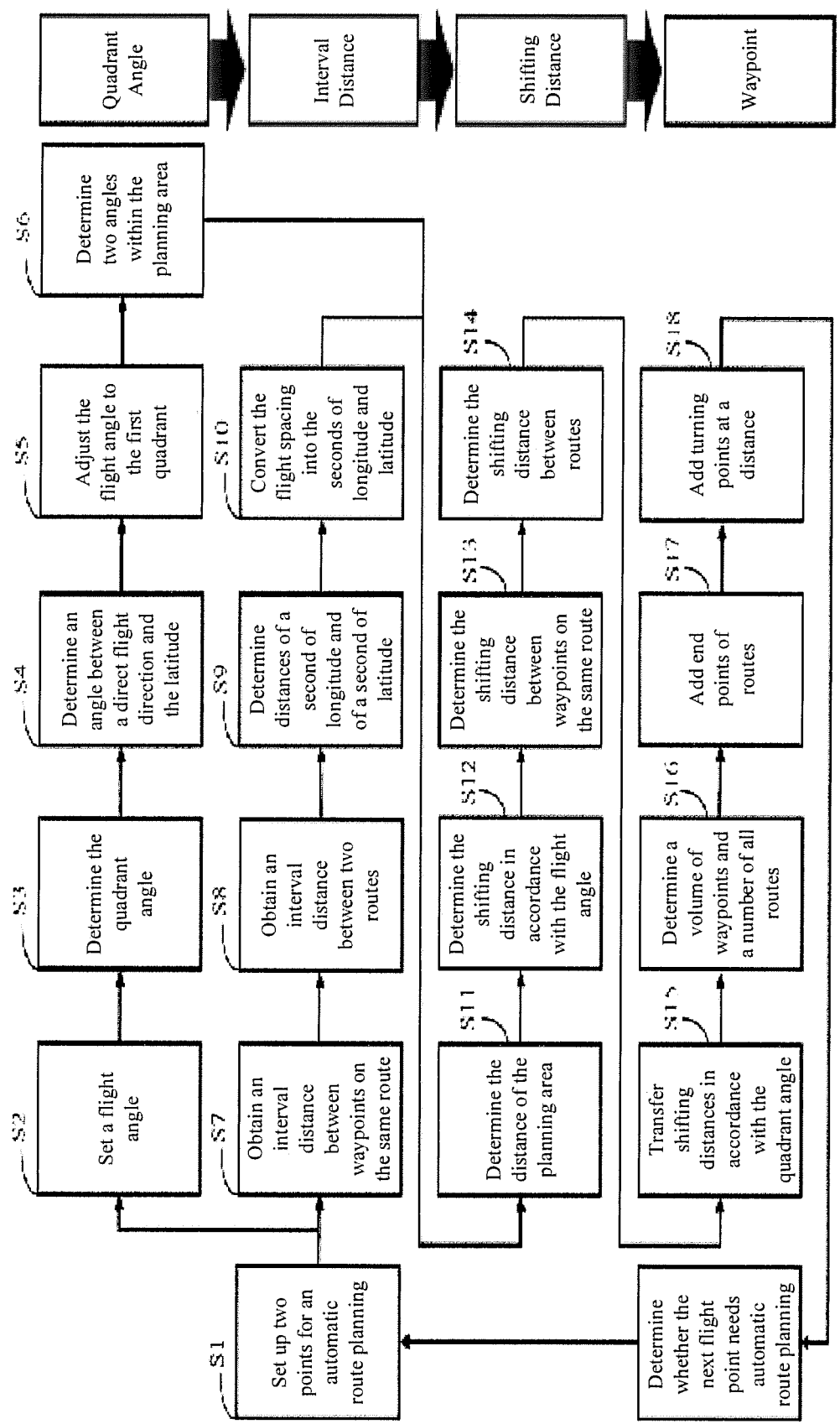
FIG. 8 is a flow chart of an exemplary route planning method for an unmanned aerial vehicle, according to some embodiments of the present disclosure.

FIG. 8 is a flow chart of an exemplary route planning method for an unmanned aerial vehicle, according to some embodiments of the present disclosure. The route planning method includes steps S1-S18. As shown in FIG. 8, step S1 may include setting up coordinates of two points for an automatic route planning, i.e., the longitude and latitude of both the starting point A and the ending point B. For example, the method may include setting the following coordinates:

Coordinates of the starting point A:
the latitude: 23.948312, and the longitude: 121.552949.
Coordinates of the ending point B:
the latitude: 23.956117, and the longitude: 121.569686.

Figure 9:
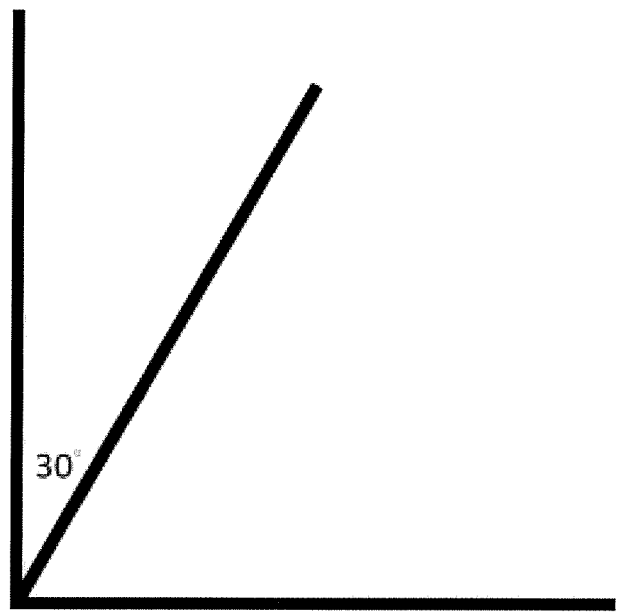
FIG. 9 is an exemplary schematic diagram of a flight angle in an exemplary route planning method for an unmanned aerial vehicle, according to some embodiments of the present disclosure.

As shown in FIG. 8, step S2 may include setting a flight angle and other angles for the automatic route planning for the UAV to fly in a task area. The UAV may have a roundtrip in accordance with the flight angle. The flight angle can be set by assuming a zero degree for the geographical north, or a parallel line of longitude. The flight angle increases in a clockwise direction. For example, FIG. 9 illustrates a flight angle of 30 degree.

Referring back to FIG. 8, step S3 may include determining the quadrant angle in accordance with the coordinates of the starting point and the ending point. Step S3 of the method may include determining in accordance with the following rules:

The first quadrant:
Longitude of the starting point A<Longitude of the ending point B, and
Latitude of the starting point A<Latitude of the ending point B The second quadrant:
Longitude of the starting point A>Longitude of the ending point B, and
Latitude of the starting point A<Latitude of the ending point B The third quadrant:
Longitude of the starting point A>Longitude of the ending point B, and
Latitude of the starting point A>Latitude of the ending point B The fourth quadrant:
Longitude of the starting point A<Longitude of the ending point B, and
Latitude of the starting point A>Latitude of the ending point B X-axis:
Latitude of the starting point A=Latitude of the ending point B Y-axis:
Longitude of the starting point A=Longitude of the ending point B According to the above rules and the coordinates of the above starting point A and the ending point B, step S3 may include determining the starting point A and the ending point B belonging to the first quadrant.

Figure 10:
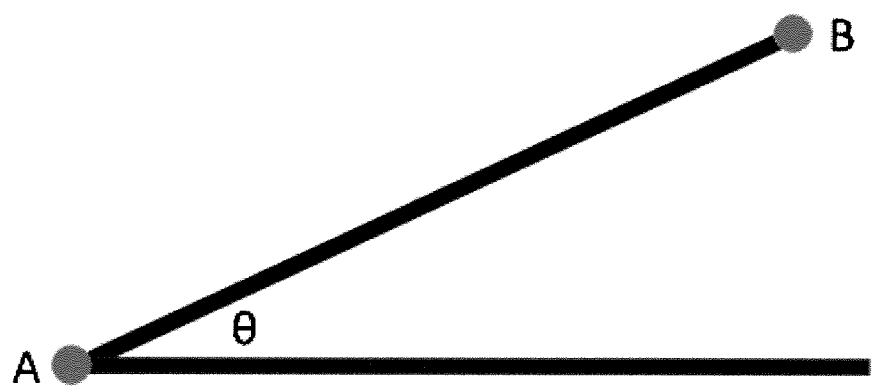
FIG. 10 is an exemplary schematic diagram of an angle of a direct flight in an exemplary route planning method for an unmanned aerial vehicle, according to some embodiments of the present disclosure.

Step S4 may include determining an angle between a direct flight direction, from the starting point to the ending point, and the latitude being parallel with the equator, i.e., the angle $\theta$. For example, as shown in FIG. 10, the angle $\theta$ is between the direct flight direction, from the starting point A to the ending point B, and a latitude being parallel with the equator. Referring back to FIG. 8, step S4 may include determining based on the following calculations and rules:

Difference $X$=Longitude of the ending point $B$−Longitude of the starting point $A$ Difference $Y$=Latitude of the ending point $B$−Latitude of the starting point $A$ $\theta = a\tan 2 \text{ (Difference } Y\text{−Difference } X)*(45/a\tan(1))$ Applying the coordinates of the starting point A and the ending point B to the above calculations:

Difference $X$=121.569686−121.552949=0.016737

Difference $Y$=23.956117−23.948312=0.007805

$\theta = a\tan 2(0.007805 - 0.016737)*(45/a\tan(1))=25°$

The angle between a direct flight direction, from the starting point to the ending point, and the latitude being parallel with the equator is 25 degree. As illustrated in steps S3 and S4, the angle can be obtained after determining the quadrant angle. In some embodiments, the method may include determining the quadrant angle before obtaining the above angle.

Step S5 may include adjusting the flight angle into the range of the first quadrant. When an angle ≤90 degree, there is no need to adjust. When angles are in other quadrants, the remainder obtained by dividing the flight angle by 90 degree is the flight angle adjusted into the first quadrant. For example, if the flight angle is 235 degree, 55 degree is the remainder of 235 degree/90 degree. Accordingly, the flight angle is adjusted into the first quadrant as 55 degree. When the flight angle is 270 degree, the flight angle should be 90 degree.

Figure 11:
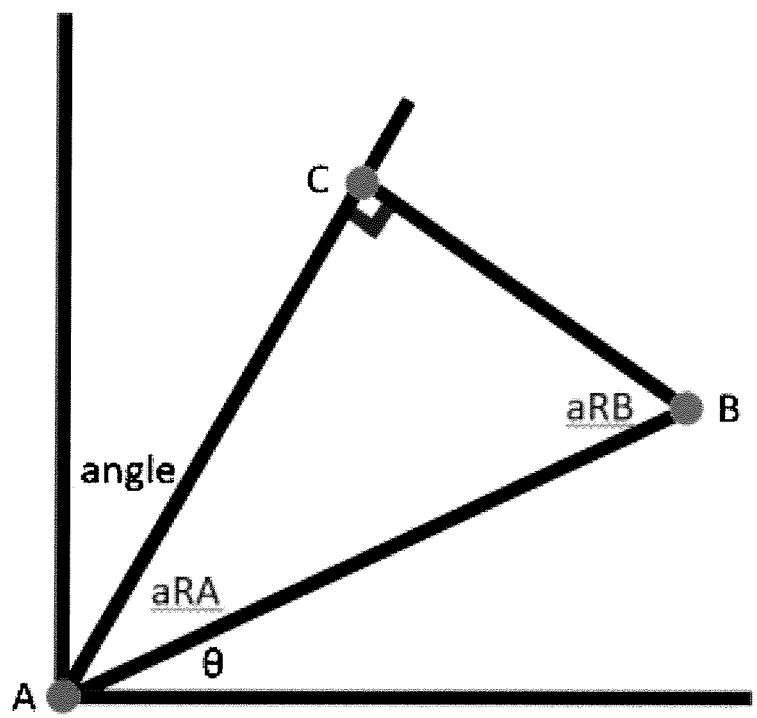
FIG. 11 is an exemplary schematic diagram of angle determination in an exemplary route planning method for an unmanned aerial vehicle, according to some embodiments of the present disclosure.

Step S6 may include determining two angles, aRB and aRA, within the planning area formed in accordance with the flight angle. For example, as shown in FIG. 11, the method may include adding a point C by vertically projecting the point B on an extending line of the flight angle. The right triangle is formed by points A, B and C. In addition to an inner right angle, the inner angle neighboring the point A is aRA and the inner angle neighboring the point B is aRB. The degree of the aRa and aRB can be obtained in accordance with the following calculations:

Angle=flight angle $aRA=90°-\text{Angle}-\theta$ $aRB=90°-aRA$

Applying the above angle values: angle=30°, and $\theta$=25° to the above calculations:

$aRA=90°-30°-25°=35°$ $aRB=90°-35°=55°$

Step S7 may include obtaining an interval distance between waypoints on the same route, i.e., the distance between two most approximate waypoints. The interval distance between waypoints is the spacing between two neighboring waypoints on the same route. The spacing value may be input through a user interface. The spacing, designated as Spacing FB, may range between 10 cm to 1 km. In the following description, Spacing FB=120 m can be used as an exemplary interval distance between waypoints.

Step S8 may include obtaining an interval distance between two routes, i.e., the spacing between two most approximate waypoints respectively on two neighboring parallel routes. The spacing value can also be input through the user interface. The spacing, designated as Spacing LR, may range from 10 cm to 1 km. In the following example, Spacing LR=180 m can be used as an exemplary interval distance between routes. There is a connecting line between two routes and the length of the connecting line equals the spacing of two most approximate waypoints on the two parallel routes.

Step S9 may include determining the distances of a second of longitude and of a second of latitude at the present location. Step S9 may include determining in accordance with the following equations:

Latitude Circumference=$m1+(m2*\cos(2\varphi))+(\cos(4\varphi))+(m4*\cos(6\varphi))$ meters Longitude Circumference=$(n1*\cos\varphi)+(n2*\cos(3\varphi))+(n3*\cos(5\varphi))$ meters Latitude Length (the distance of a second of latitude)=Latitude Length Degree/3,600 meters Longitude Length (the distance of a second of longitude)=Longitude Length Degree/3,600 meters wherein m1=111132.92, m2=−559.82, m3=1.175, m4=−0.0023, n1=111412.84, n2=−93.5, n3=0.118, and φ (radian)= Latitude of the starting point A*(a tan(1)/45).

In some embodiments, step S9 may include respectively applying the latitudes of the starting point and the ending point to Latitude*(a tan(1)/45), and averaging two results to obtain φ.

For example, applying the latitude of the starting point A=23.948312:

$\varphi$=23.948312*(a tan(1)/45)=0.41797689

Latitude Circumference=111132.92+(−559.82*cos(2φ))+(1.175*cos(4φ))+(−0.0023*cos(6φ))= 110757.46054609 meters Longitude Circumference=(111412.84*cos φ)+(−93.5*cos(3φ))+(0.118*cos(5φ))= 101792.34074817 meters Latitude Length (the distance of a second of latitude)=110757.46054609/3600=30.76596126 meters Longitude Length (the distance of a second of longitude)=101792.34074817/3600=28.27565020 meters Step S10 may include converting the flight spacing into seconds of longitude and latitude, not including weighting calculation. Step S10 may include converting by the following calculations:

Second FB=Spacing FB/Latitude Length/3600 (degree)

Second LR=Spacing LR/Longitude Length/3600 (degree)

Applying Spacing FB=120 and Spacing LR=180:

Second FB=(120/30.76596126) second/3600=0.00108345 (degree)

Second LR=(180/28.27565020) second/3600=0.00176831 (degree)

where Second FB is the converted longitude and latitude of the interval distance between waypoints on the same route, and Second LR is the converted longitude and latitude of the interval distance between routes.

Figure 12:
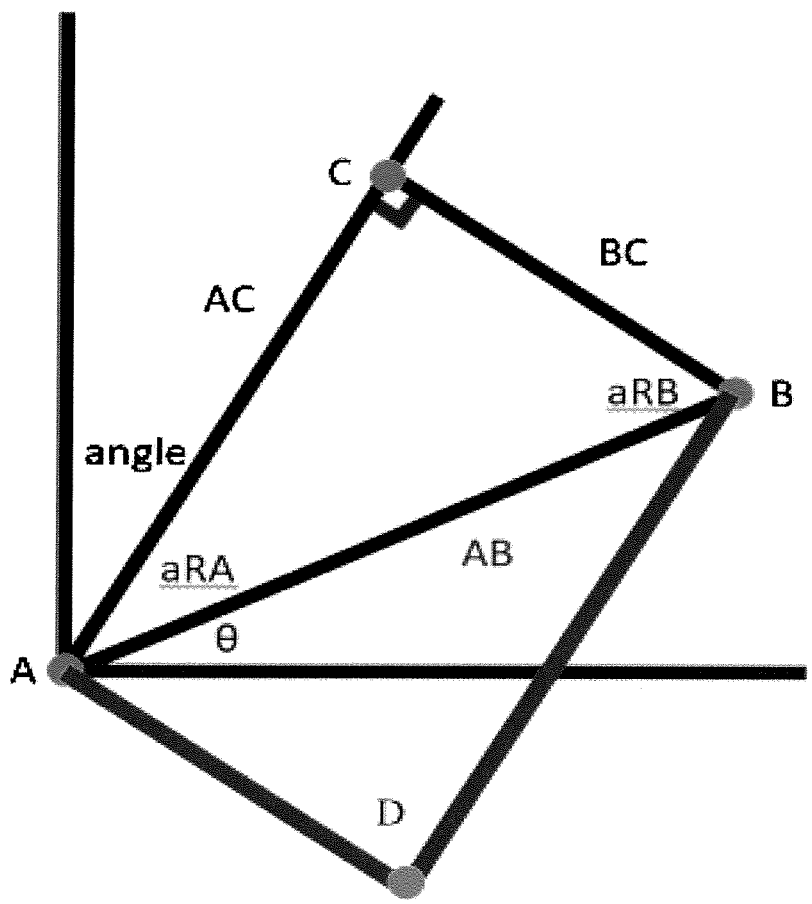
FIG. 12 is an exemplary schematic diagram of an exemplary planning area in an exemplary route planning method for an unmanned aerial vehicle, according to some embodiments of the present disclosure.

As shown in FIG. 8, step S11 may include determining the distance of the planning area (i.e. a rectangle) formed based on the flight angle. Step S11 may include determining the spacing between lines, in the planning area formed by the flight angle, in accordance with the right triangle and the law of sine. Step S11 may include determining in accordance with the following equations according to the exemplary embodiment shown in FIG. 12:

Length Range $AB$=Distance$(A,B)$

Length Range $BC$=Length Range $AB$*sin($aRA$*(a tan(1)/45))

Length Range $AC$=Length Range $AB$*sin($aRB$*(a tan(1)/45))

Applying the coordinates of points A and B, aRA=35 and aRB=55:

Length Range $AB$=Distance$(A,B)$=0.01846741

Length Range $BC$=0.01846741*sin(35*(a tan(1)/45))= 0.01059247

Length Range $AC$=0.01846741*sin(55*(a tan(1)/45))= 0.0151276 wherein Length Range AB is the distance between points A and B, and the unit is expressed by longitude and latitude (radian); Length Range BC is the distance between points B and C, and the unit is expressed by longitude and latitude (radian); Length Range AC is the distance between points A and C, and the unit is expressed by longitude and latitude (radian).

The distance between points A and D of the rectangle formed by points A, B, C and D equals length range BC. The distance between points B and D equals length range AC. The rectangle is the planning area in the route planning.

Step S12 may include determining the shifting distance in accordance with the weighted distance based on the flight angle to correct the results obtained in step S9. Step S12 may include determining in accordance with the proportions of the flight angle within the angle formed by longitude and latitude to obtain the weighted distances of seconds of longitude and latitude. Step S12 may include determining in accordance with the following equations:

$XW$ (the weighted distance of longitude)=((90°−angle)/90°)*Longitude Length+(angle/90°)*Latitude Length $YW$ (the weighted distance of latitude)=(angle/90°)*Longitude Length+((90°−angle)/90°)*Latitude Length Applying angle=30, Longitude Length=28.27565020, Latitude Length=30.76596126:

$XW$=((90−30)/90)*28.27565020+(30/90)*30.76596126=29.10575389 (meters)

$YW$=(30/90)*28.27565020+((90−30)/90)*30.76596126=29.93585757 (meters)

Figure 13:
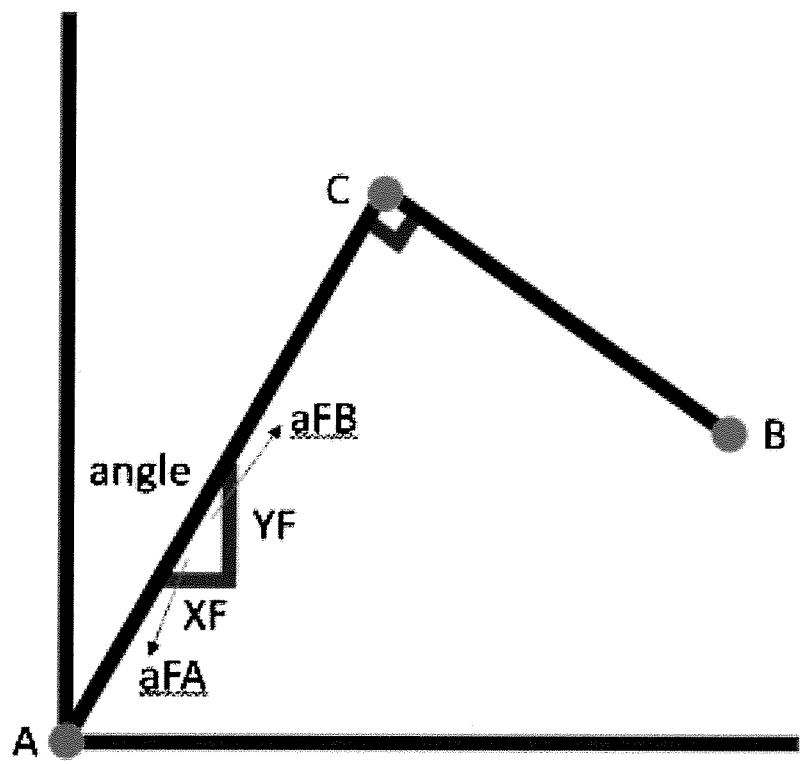
FIG. 13 is an exemplary schematic diagram of shifting on a route in an exemplary route planning method for an unmanned aerial vehicle, according to some embodiments of the present disclosure.

As shown in FIG. 8, step S13 may include determining the shifting distance between waypoints on the same route. Step S13 may include determining the shifting distance by using the right triangle and the law of sine. For example, step S13 may include determining in accordance with the following equations according to the exemplary embodiment shown in FIG. 13:

$aFA$=90−angle $aFB$=90−$aFA$ $XF$=Spacing $FB$*sin($aFB$*(a tan(1)/45))/$XW$/3600

$YF$=Spacing $FB$*sin($aFA$*(a tan(1)/45))/$YW$/3600

Applying angle=30°, Spacing FB=120, XW=29.10575389, and YW=29.93585757:

$aFA$=90−30=60

$aFB = 90-60 = 30$ $XF = 120*\sin(30*(a\tan(1)/45))/29.10575389/3600 = 0.00057262$ $YF = 120*\sin(60*(a\tan(1)/45))/29.93585757/3600 = 0.00096431$ wherein XF is the horizontal (X-axis) shifting distance between waypoints on the same route, and the unit is expressed by longitude and latitude (radian); and YF is the longitudinal (Y-axis) shifting distance between waypoints on the same route, and the unit is expressed by longitude and latitude (radian).

Figure 14:
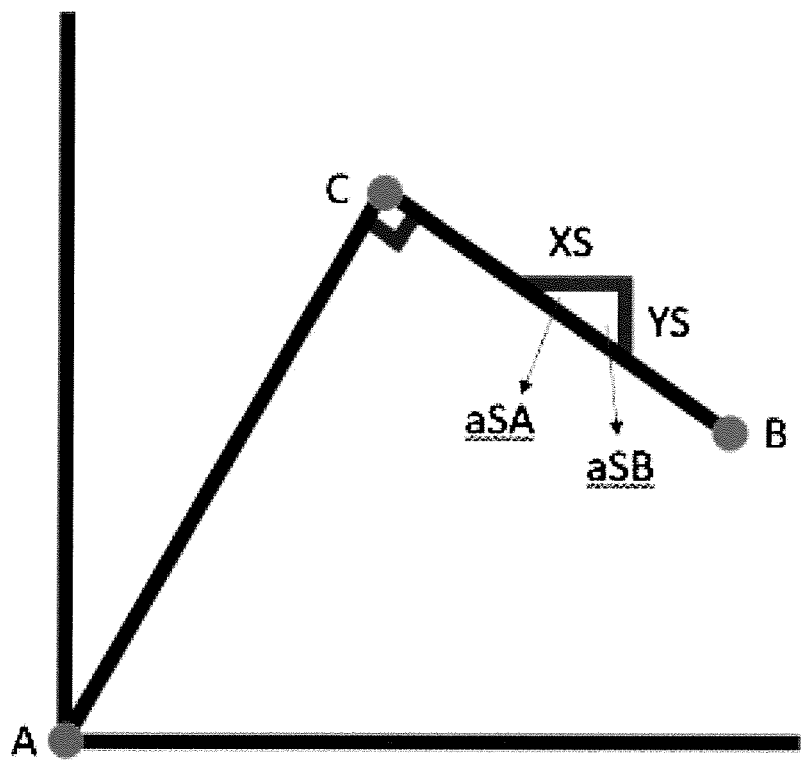
FIG. 14 is an exemplary schematic diagram of shifting between routes in an exemplary route planning method for an unmanned aerial vehicle, according to some embodiments of the present disclosure.

As shown in FIG. 8, step S14 may include determining the shifting distance between routes. Step S14 may include determining the shifting distance by using the right triangle and the law of sine. Step S14 may include determining in accordance with the following equations according to the exemplary embodiment shown in FIG. 14:

$aSA = aFB$ $aSB = aFA$ $XS = \text{Spacing } LR*\sin(aSB*(a\tan(1)/45))/XW/3600$ $YS = \text{Spacing } LR*\sin(aSA*(a\tan(1)/45))/YW/3600$ Applying aFB=30, aFA=60, Spacing LR=180, XW=29.10575389, and YW=29.93585757:

$aSA = 30$ $aSB = 60$ $XS = 180*\sin(60*(a\tan(1)/45))/29.10575389/3600 = 0.00148772$ $YS = 180*\sin(30*(a\tan(1)/45))/29.93585757/3600 = 0.00083511$ where XS is the horizontal (X-axis) shifting distance between two neighboring routes, and the unit is expressed by longitude and latitude (radian); and YS is the longitudinal (Y-axis) shifting distance between two neighboring routes, and the unit is expressed by longitude and latitude (radian).

Step S15 may include transferring shifting distances in accordance with a type of quadrant angle. Step S15 may include transferring in accordance with the following rules:

a. According to the quadrant angle formed based on the coordinates of the starting point and the ending point.
   The first quadrant: No transfer is required.
   The second quadrant: Transfer by XS→ –XS, and YS→ –YS
   The third quadrant: Transfer by XF→ –XF, YF→ –YF, XS→ –XS, and YS→ –YS
   The fourth quadrant: Transfer: XF→ –XF, and YF→ –YF
   X-axis: No transfer is required.
   Y-axis: No transfer is required.
b. According to the angle between the starting point and the ending point to determine whether to transfer.
   aRA<0: XF → –XF, YF→ –YF, XS→ –XS, and YS→ –YS
c. According to the angle between the starting point and the ending point to determine whether to transfer:
   aRA<0: XW→ YW, and YW→ XW Step S16 may include determining a volume of waypoints for photography shooting and a number of all routes. Step S16 may include determining this volume in accordance with the planning area and the flight spacing. For example, step S16 may include determining weighted longitude and latitude by adding the spacing with the weighted value, and the formula is as follows:

Second $FB = \text{Spacing } FB/YW/3600$

Second $LR = \text{Spacing } LR/XW/3600$

Count $FB = \text{Length Range } AC/\text{Second } FB$

Count $LR = \text{Length Range } BC/\text{second } LR$

Applying Spacing FB=120, Spacing LR=180, YW=29.93585757, XW=29.10575389, Length Range AC=0.01512761, and Length Range BC=0.01059247:

Second $FB = 120/29.93585757/3600 = 0.00111349$

Second $LR = 180/29.10575389/3600 = 0.00171787$

Count $FB$(a volume of photography shooting of waypoints)$= 0.01512761/0.00111349 = 13.585 = 13$ (rounded)

Count $LR$(a number of routes)$= 0.01059247/0.00171787 = 6.166 = 6$ (rounded)

In some embodiments, the method may further include adding one more waypoint and one more route. For photography shooting, for example, in view of the peripheral duplication rate of shooting zones, the method may further include adding one waypoint at one end of a route and adding one route. As the serial numbers begin from 0, the volume of waypoints and the number of routes may remain unchanged. For example, the volume of waypoints for photography shooting is 14 with serial numbers range from 0 to 13, and the number of routes is 7 with serial numbers range from 0 to 6.

Figure 15:
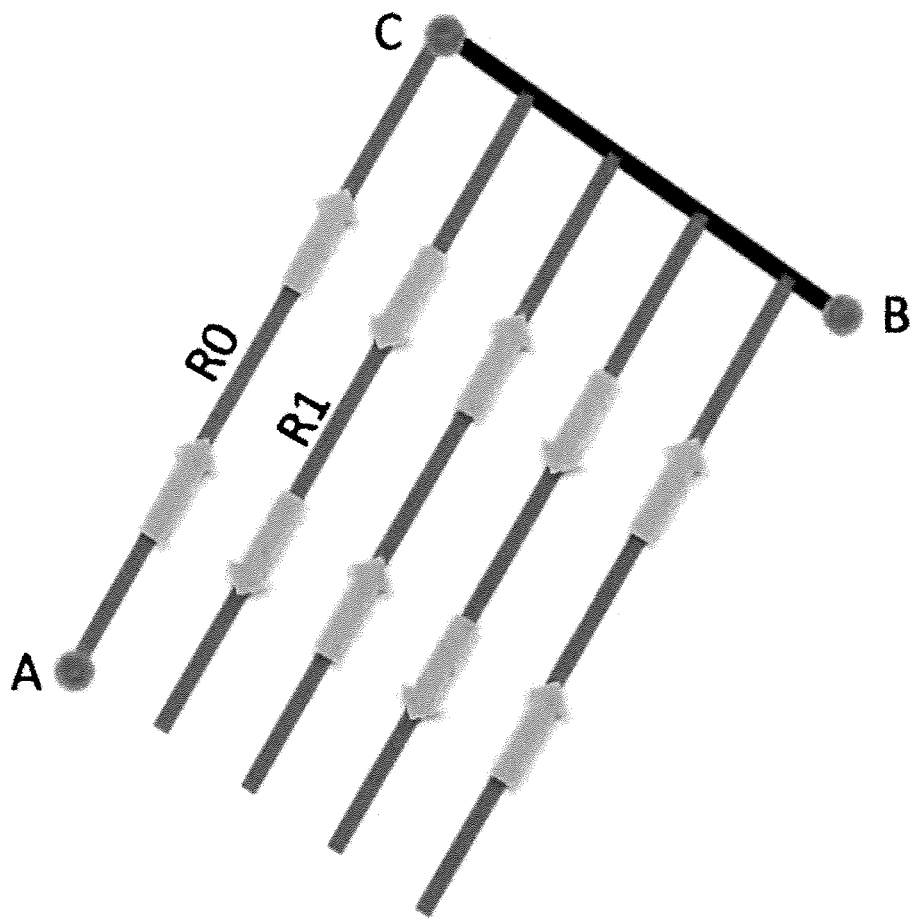
FIG. 15 is an exemplary schematic diagram of route directions in an exemplary route planning method for an unmanned aerial vehicle, according to some embodiments of the present disclosure.

As shown in FIG. 8, step S17 may include adding an end point (i.e. a waypoint) in one of the routes. The method may also need to consider the angle for the opposite direction as well as the flight angle when the UAV flies on its return trip. As shown in FIG. 15, a flight angle from the point A to the point B is 30 degree. An odd route serial number, such as the route R1, is in an inner-direction state. The method may include determining the longitude and latitude of the end point for photography shooting in accordance with the following equations:

Longitude of waypoints for photography shooting: Longitude of the point $A$+Count $FBC*XF$+ Count $LRC*XS$ Latitude of waypoint for photography shooting: Latitude of the point $A$+Count $FBC*YF$–Count $LRC*YS$ where Count FBC equals a new added number of waypoints for photography shooting, and Count LRC equals an existing number of routes.

Figure 16:
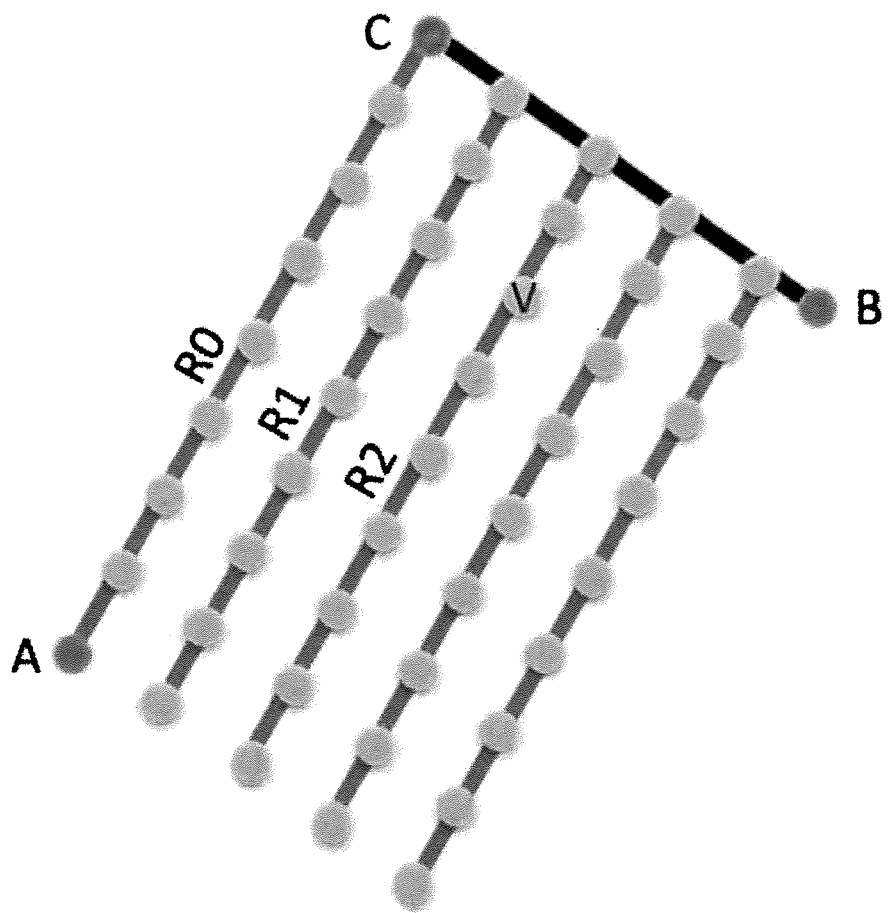
FIG. 16 is an exemplary schematic diagram of waypoints in a route planning method for an unmanned aerial vehicle, according to some embodiments of the present disclosure.

For example, as shown in FIG. 16, applying Longitude of the point A=121.552949, Count FBC=6, Count LRC=2, XF=0.00057262, XS=0.00148772, Latitude of the point A=23.948312, YF=0.00096431, and YS=0.00083511:

Longitude of waypoint $V$ for photography shooting: $121.552949+6*0.00057262+2*0.00148772=121.55936016$ Latitude of waypoint $V$ for photography shooting: $23.948312+6*0.00096431-2*0.00083511=23.95242764$ As shown in FIG. 8, step S18 may include adding a turning point at a distance. The turning point is for the UAV to turn around toward the next route. Step S18 may also include determining the longitude and latitude of a turning point as follows:

Forward direction:

Longitude of the turning point: Longitude of the point $A$+(Count $FB$+Turning)*$XF$+Count $LRC$*$XS$−0.5*$XS$ Latitude of the turning point: Latitude of the point $A$+(Count $FB$+Turning)*$YF$−Count $LRC$ $YS$+0.5*$YS$ Reversed direction:

Longitude of the turning point: Longitude of the point $A$−Turning*$XF$+Count $LRC$*$XS$−0.5*$XS$ Latitude of the turning point: Latitude of the point $A$−Turning*$YF$−Count $LRC$*$YS$+0.5*$YS$ where Count FB is the number of all waypoints for photography shooting on one route, Count LRC is a current number of routes, Turning is the multiple of the extended distance for turning.

Figure 17:
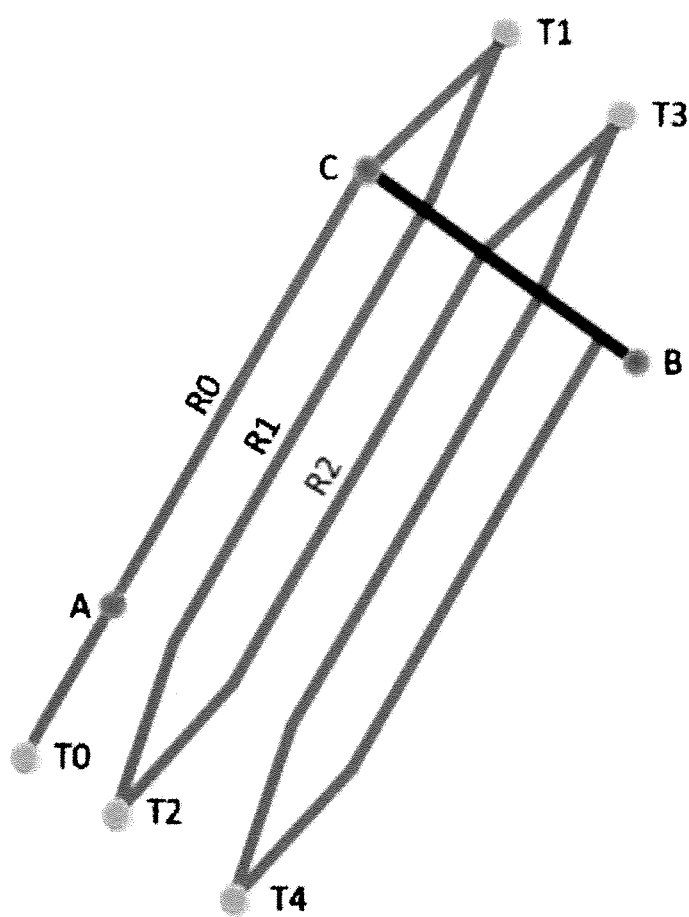
FIG. 17 is an exemplary schematic diagram of turning points in an exemplary route planning method for an unmanned aerial vehicle, according to some embodiments of the present disclosure.

As shown in FIG. 17, there are the third turning point T3 and the second turning point T2. T0 is the beginning point. A default Turning may be a triple distance. The actual Turning value may rely on the turning features of the UAV. For example, applying Turning=3 and the above parameter values:

Forward direction:

Longitude of the turning point $T3$: 121.552949+(13+3)*0.00057262+3*0.00148772−0.5*0.00148772=121.56583022

Latitude of the turning point $T3$: 23.948312+(13+3)*0.00096431−3*0.00083511+0.5*0.00083511=23.961653185

Reversed direction:

Longitude of the turning point $T2$: 121.552949−3*0.00057262+2*0.00148772−0.5*0.00148772=121.55346272

Latitude of the turning point $T2$: 23.948312−3*0.00096431−2*0.00083511+0.5*0.00083511=23.944166405

After the above parameters are obtained through the above steps, the coordinates of each waypoint for photography shooting and each turning point can be obtained. The method can include planning a flight path by serially connecting these waypoints and turning points.

As another example, the starting point A and the ending point B are in the third quadrant. The method for route planning may include the above steps. The latitude of the starting point A can be 23.956117, and the longitude can be 121.569686. The latitude of the ending point B can be 23.948312, and the longitude can be 121.552949. Points A and B forms a flight angle in the third quadrant, and the flight angle equals 30 degree. The other parameters can be obtained as follows:

$\theta$=−155°

$aRA$=215°

$aRB$=−125°

Spacing $FB$=120 meters

Spacing $LR$=180 meters

Latitude Length=30.76599252 meters

Longitude Length=28.27394875 meters

Second $FB$=0.00108345 (degree)

Second $LR$=0.00176841 (degree)

Length Range $AB$=0.01846741 (radian)

Length Range $BC$=−0.01059247 (radian)

Length Range $AC$=−0.01512761 (radian)

$XW$=29.10463001 meters $YW$=29.93531127 meters $XF$=0.00057265 (radian)

$YF$=0.00096433 (radian)

$XS$=0.00148778 (radian)

$YS$=0.00083513 (radian)

After adjusting in accordance with the quadrant angle, there may be a need to transfer directions as being in the third quadrant:

$XF$=−0.00057265 (radian)

$YF$=−0.00096433 (radian)

$XS$=−0.00148778 (radian)

$YS$=−0.00083513 (radian)

Count $FB$=14

Count $LR$=7

The method may include obtaining the coordinates of each waypoint and each turning point in accordance with the above parameters. The method may include planning the flight path accordingly.

Another aspect of the disclosure is directed to a non-transitory computer-readable medium storing a set of instructions that are executable by one or more processors of an apparatus to cause the apparatus to perform a method for route planning for an unmanned aerial vehicle, as discussed above. The computer-readable medium may include volatile or nonvolatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be appreciated that the present disclosure is not limited to the exact construction that has been described above and illustrated in the accompanying drawings, and that various modifications and changes can be made without departing from the scope thereof. It is intended that the scope of the application should only be limited by the appended claims.

What is claimed is:

1. A route planning method for an unmanned aerial vehicle, the route planning method comprising:
determining a flight angle in accordance with a starting point and an ending point in latitude and longitude, wherein the starting and ending points each include latitude and longitude values;

determining a quadrant angle in accordance with the starting point and the ending point;

adjusting the flight angle to a first quadrant of a coordinate plane, based on the quadrant angle, wherein the coordinate plane comprises an origin at the starting point;

determining a flight shifting distance between waypoints in accordance with the first-quadrant flight angle, the quadrant angle, and a first interval distance between waypoints or a second interval distance between routes;

calculating a plurality of waypoints in latitude and longitude and a plurality of routes in accordance with the first-quadrant flight angle, the quadrant angle, and the flight shifting distance between waypoints;

planning a flight path in accordance with the plurality of waypoints and the plurality of routes; and controlling the unmanned aerial vehicle to fly in accordance with the flight path.

2. The route planning method of claim 1, further comprising:

determining a first angle and a second angle based on the first-quadrant flight angle; and obtaining a planning area based on the first and second angels.

3. The route planning method of claim 1, further comprising:

determining distances of a second of latitude and a second of longitude in accordance with the starting point and the ending point; and converting the first interval distance between waypoints and the second interval distance between routes to be in units of the second of latitude and the second of longitude, wherein determining the flight shifting distance between waypoints includes determining the flight shifting distance between waypoints in the second of latitude and the second of longitude based on the first interval distance between waypoints or the second interval distance between routes.

4. The route planning method of claim 2, wherein determining the flight shifting distance between waypoints includes:

determining the flight shifting distance between two of the waypoints within the planning area;

determining a weighted flight shifting distance in accordance with the flight shifting distance between waypoints and the first-quadrant flight angle, wherein the weighted flight shifting distance includes a directional flight shifting distance associated with positions of the two of the waypoints; and determining a waypoint shifting distance between the two of the waypoints, wherein the waypoint shifting distance includes a directional flight shifting distance from a first to a second of the two of the waypoints.

5. The route planning method of claim 1, further comprising:

adding a turning point between two of the plurality of routes, wherein planning the flight path includes planning the flight path in accordance with the plurality of waypoints, the plurality of routes, and the turning point.

6. A route planning apparatus for an unmanned aerial vehicle, the route planning apparatus comprising:

memory storing instructions;

one or more processors configured to execute the instructions to cause the route planning apparatus to:

determine a flight angle in accordance with a starting point and an ending point in latitude and longitude, wherein the starting and ending points each include latitude and longitude values;

determine a quadrant angle in accordance with the starting point and the ending point;

adjust the flight angle to a first quadrant of a coordinate plane, based on the quadrant angle, wherein the coordinate plane comprises an origin at the starting point;

determine a flight shifting distance between waypoints in accordance with the first-quadrant flight angle, the quadrant angle, and a first interval distance between waypoints or a second interval distance between routes;

calculate a plurality of waypoints in latitude and longitude and a plurality of routes in accordance with the first-quadrant flight angle, the quadrant angle and the flight shifting distance between waypoints;

plan a flight path in accordance with the plurality of waypoints and the plurality of routes; and control the unmanned aerial vehicle to fly in accordance with the flight path.

7. The route planning apparatus of claim 6, wherein the one or more processors are further configured to execute the instructions to cause the route planning apparatus to:

determine a first angle and a second angle based on the first-quadrant flight angle; and obtain a planning area based on the first and second angels.

8. The route planning apparatus of claim 6, wherein the one or more processors are further configured to execute the instructions to cause the route planning apparatus to:

determining distances of a second of latitude and a second of longitude in accordance with the starting point and the ending point; and convert the first interval distance between waypoints and the second interval distance between routes to be in units of the second of latitude and the second of longitude, wherein the one or more processors are configured to execute the instructions to cause the route planning apparatus to determine the flight shifting distance between waypoints in the second of latitude and the second of longitude based on the first interval distance between waypoints or the second interval distance between routes.

9. The route planning apparatus of claim 7, wherein the one or more processors being configured to cause the route planning apparatus to execute the instructions to determine the flight shifting distance between waypoints includes:

determine the flight shifting distance between two of the waypoints within the planning area;

determine a weighted flight shifting distance in accordance with the flight shifting distance between waypoints and the first-quadrant flight angle, wherein the weighted flight shifting distance includes a directional flight shifting distance associated with positions of the two of the waypoints; and determine a waypoint shifting distance between the two of the waypoints, wherein the waypoint shifting distance includes a directional flight shifting distance from a first to a second of the two of the waypoints.

10. The route planning apparatus of claim 6, wherein the one or more processors are further configured to execute the instructions to cause the route planning apparatus to:

add a turning point between two of the plurality of routes, wherein the one or more processors being configured to execute the instructions to plan the flight path includes being configured to plan the flight path in accordance with the plurality of waypoints, the plurality of routes, the end point, and the turning point.

11. A non-transitory computer-readable medium storing a set of instructions that is executable by one or more processors of an apparatus to cause the apparatus to perform a method for route planning for an unmanned aerial vehicle, the method comprising:
    determining a flight angle in accordance with a starting point and an ending point in latitude and longitude, wherein the starting and ending points each include latitude and longitude values;
    determining a quadrant angle in accordance with the starting point and the ending point;
    adjusting the flight angle to a first quadrant of a coordinate plane, based on the quadrant angle, wherein the coordinate plane comprises an origin at the starting point;
    determining a flight shifting distance between waypoints in accordance with the first-quadrant flight angle, the quadrant angle, and a first interval distance between waypoints or a second interval distance between routes;
    calculating a plurality of waypoints in latitude and longitude and a plurality of routes in accordance with the first-quadrant flight angle, the quadrant angle and the flight shifting distance between waypoints;
    planning a flight path in accordance with the plurality of waypoints and the plurality of routes; and
    controlling the unmanned aerial vehicle to fly in accordance with the flight path.

12. The non-transitory computer-readable medium of claim 11, wherein the set of instructions that is executable by the one or more processors of the apparatus to cause the apparatus to further perform:
    determining a first angle and a second angle based on the first-quadrant flight angle; and
    obtaining a planning area based on the first and second angels.

13. The non-transitory computer-readable medium of claim 11, wherein the set of instructions that is executable by the one or more processors of the apparatus to cause the apparatus to further perform:
    determining distances of a second of latitude and a second of longitude in accordance with the starting point and the ending point; and
    converting the first interval distance between waypoints and the second interval distance between routes to be in units of the second of latitude and the second of longitude,
    wherein determining the flight shifting distance between waypoints includes determining the flight shifting distance between waypoints in the second of latitude and the second of longitude based on the first interval distance between waypoints or the second interval distance between routes.

14. The non-transitory computer-readable medium of claim 12, wherein determining the flight shifting distance between waypoints includes:
    determining the flight shifting distance between two of the waypoints within the planning area;
    determining a weighted flight shifting distance in accordance with the flight shifting distance between waypoints and the first-quadrant flight angle, wherein the weighted flight shifting distance includes a directional flight shifting distance associated with positions of the two of the waypoints; and
    determining a waypoint shifting distance between the two of the waypoints, wherein the waypoint shifting distance includes a directional flight shifting distance from a first to a second of the two of the waypoints.

15. The non-transitory computer-readable medium of claim 11, wherein the set of instructions that is executable by the one or more processors of the apparatus to cause the apparatus to further perform:
    adding a turning point between two of the plurality of routes,
    wherein planning the flight path includes planning the flight path in accordance with the plurality of waypoints, the plurality of routes, and the turning point.

16. The route planning method of claim 1, wherein determining the quadrant angle includes an arctangent calculation based on the latitude and longitude values of the starting and ending points.

17. The route planning apparatus of claim 6, wherein the one or more processors are configured to execute the instructions to cause the route planning apparatus to determine the quadrant angle by an arctangent calculation based on the latitude and longitude values of the starting and ending points.

18. The non-transitory computer-readable medium of claim 11, wherein determining the quadrant angle includes an arctangent calculation based on the latitude and longitude values of the starting and ending points.

* * * * *